United States Patent
Toshima (10) Patent No.: US 9,383,484 B2
(45) Date of Patent: Jul. 5, 2016

(54) LIGHT-SHIELDING MATERIAL FOR OPTICAL INSTRUMENT

(75) Inventor: Yasumaro Toshima, Saitama (JP)

(73) Assignee: KIMOTO CO. LTD. (JP)

( * ) Notice: Subject to any disclaimer, the term of this patent is extended or adjusted under 35 U.S.C. 154(b) by 271 days.

(21) Appl. No.: 14/008,624

(22) PCT Filed: Feb. 29, 2012

(86) PCT No.: PCT/JP2012/055053
§ 371 (c)(1),
(2), (4) Date: Sep. 30, 2013

(87) PCT Pub. No.: WO2012/132727
PCT Pub. Date: Oct. 4, 2012

(65) Prior Publication Data
US 2014/0016202 A1 Jan. 16, 2014

(30) Foreign Application Priority Data
Mar. 28, 2011 (JP) .................. 2011-071093

(51) Int. Cl.
*G02B 5/02* (2006.01)
*G02B 5/00* (2006.01)

(52) U.S. Cl.
CPC ............... *G02B 5/021* (2013.01); *G02B 5/003* (2013.01); *G02B 5/0221* (2013.01); *G02B 5/0226* (2013.01); *G02B 5/02* (2013.01); *G02B 5/0205* (2013.01); *G02B 5/0215* (2013.01); *G02B 5/0268* (2013.01); *G02B 5/0273* (2013.01)

(58) Field of Classification Search
CPC ...... G02B 5/02; G02B 5/0205; G02B 5/0215; G02B 5/0221; G02B 5/0226; G02B 5/0268; G02B 5/0273; G02B 5/021; G02B 5/003

USPC .......... 359/609, 613–614, 599, 601; 428/409, 428/410, 601, 98, 119, 141, 142, 432–434, 428/688–703
See application file for complete search history.

(56) References Cited

U.S. PATENT DOCUMENTS 6,069,196 A * 5/2000 Akao et al. .................... 524/424
2002/0009573 A1* 1/2002 Kimura et al. ................ 428/142
2009/0316269 A1* 12/2009 Kim et al. ..................... 359/599

*Primary Examiner* — Thomas K Pham
*Assistant Examiner* — Alberto Betancourt
(74) *Attorney, Agent, or Firm* — Bacon & Thomas, PLLC (57) ABSTRACT

Provided is a light-shielding material for use in optical instrument and having a light-shielding sheet with broad low-gloss region while maintaining the physical properties necessary for a light-shielding sheet. The light-shielding material 1 comprises a light-shielding sheet 4 on a substrate 2, and the surface properties of the light-shielding sheet 4 are adjusted so as to fulfill at least one of A1 and A2, and at least one of B1 and B2. A1 is the condition that the arithmetic average roughness Sa in a three-dimensional surface roughness measurement is 0.4 or larger and 2.0 or smaller, A2 is that the ten-point average roughness Sz in a three-dimensional surface roughness measurement is 1 or larger and 20 or smaller. Defining a central plane of projections and recesses in a three-dimensional surface roughness measurement as a reference plane, Pn (n is any positive integer) as the number of projections which protrude to a plane located at a height of n times Sa from the reference plane, $P_{n+1}$ as the number of projections which protrude to a plane located at a height of (n+1) times Sa, and Rn as the ratio ($P_{n+1}$/Pn) of Pn and $P_{n+1}$, B1 is the condition that R1 is 55% or greater and R4 is 7% or greater, and B2 is the condition that at least R1 is 55% or greater, R2 is 15% or greater and R3 is 8% or greater.

18 Claims, 2 Drawing Sheets

LIGHT-SHIELDING MATERIAL FOR OPTICAL INSTRUMENT

TECHNICAL FIELD

The present invention relates to a light-shielding material suitably used in light-shielding part of various optical instrument and particularly having a full delustering property.

BACKGROUND ART

As a light-shielding sheet used for light-shielding part as typified by a shutter and diaphragm, there is known a light-shielding sheet obtained by providing a light-shielding coat including an organic filler on a film substrate made of a synthetic resin (Patent Document 1).

RELATED ART DOCUMENT

Patent Document

Patent Document 1: Japanese Unexamined Patent Publication (Kokai) No. H07-319004

SUMMARY OF THE DISCLOSED SUBJECT MATTER

A light-shielding coat of the light-shielding sheet disclosed in the patent document 1 did not have a reliable delustering property in the light-shielding coat because a surface thereof was formed only from small unevenness. Specifically, although reflection of an incident light at an angle close to the vertical direction with respect to a surface of the light-shielding coat is suppressed, it reflects an incident light at an angle close to the horizontal direction. This reflection became a defect called ghost in optical instrument and caused a decline of product performance. Therefore, the technique in the patent document 1 was unable to absorb incident lights of all angles.

Note that a light-shielding property has to be also satisfactory besides the low glossiness against incident lights at all angles so as to maintain the product performance as a light-shielding material.

According to an aspect of the present invention, there is provided a light-shielding material for optical instrument having a light-shielding coat with a broad range of an incident angle, with which low glossiness can be obtained, (hereinafter, referred to as a low-gloss region) while maintaining a light-shielding property and other necessary physical properties of the light-shielding coat.

The present inventors repeatedly reviewed various elements which regulate a surface properties of a light-shielding coat. As a result, they found that it is possible to surely suppress reflection lights of incident lights having an angle close to the horizontal direction (for example, 85 degrees) with respect to the surface of the light-shielding coat, not to mention those having an angle close to the vertical direction (for example, 20 degrees) and 60 degrees, and to widen a low-gloss region by properly adjusting some parameter values when measuring three-dimensional surface roughness in a predetermined region at an arbitrary position of the light-shielding coat.

Namely, a light-shielding material for optical instrument according to the present invention is characterized in that a light-shielding coat has surface properties adjusted to satisfy at least one of a condition A1 and condition A2 below and at least one of a condition B1 and condition B2 in the light-shielding material for optical instrument having the light-shielding coat.

The condition A1: when referring to arithmetic average roughness in three-dimensional surface roughness measurement as Sa, a value of Sa is 0.4 or larger and 2.0 or smaller, the condition A2: when referring to ten-point average roughness in three-dimensional surface roughness measurement as Sz, a value of Sz is 1 or larger an 20 or smaller, the condition B1: when defining a central plane of projections and recesses in a three-dimensional surface roughness measurement as a reference plane, a number of projections protruding to a plane placed at a height n times Sa from the reference plane as Pn, a number of projections protruding to a plane placed at a height (n+1) times Sa as $P_{n+1}$, and a ratio $(P_{n+1}/Pn)$ of Pn and $P_{n+1}$ as Rn, (note that all of the "n" is a positive integer), R1 becomes 55% or greater and R4 becomes 7% or greater, and the condition B2: when defining Pn, Pn+1 and Rn in the same way as in the condition B1, at least R1 becomes 55% or greater, R2 becomes 15% or greater and R3 becomes 8% or greater.

In the l-s material for optical instrument according to the present invention, preferably the condition B2 further includes a condition that R4 becomes 7% or greater.

The light-shielding material for optical instrument according to the present invention is generally configured by stacking a light-shielding coat on a substrate. In that case, the light-shielding coat is configured to comprise at least a binder resin, black fine particles and a matting agent, and formed on a substrate. Note that it is not limited to the mode of such a stacking structure in the present invention and, for example, a mode of a molding obtained by curing to form a resin mixture containing black fine particles by using a mold.

According to the light-shielding material for optical instrument according to the present invention, since surface properties of the light-shielding coat are adjusted properly, a full delustering effect with a broad low-gloss region (for example, being low at all of G20, G60 and G85, which will be explained later on) is given to the light-shielding coat. Also, since the light-shielding coat contains a binder resin and black fine particles, it has a light-shielding property and other necessary physical properties.

Note that, as explained above, a light-shielding coat of a light-shielding sheet disclosed in the patent document 1 has a surface formed only by small unevenness, so that the surface property was not controlled properly, therefore, it was unable to bring out a reliable delustering effect.

DESCRIPTION OF NUMERICAL NOTATIONS

1 . . . light-shielding material for optical instrument, 2 . . . substrate, 4 . . . light-shielding coat

EXEMPLARY MODE FOR CARRYING OUT THE DISCLOSED SUBJECT MATTER

Below, an embodiment of the present invention will be explained based on the drawings.

Figure 1:
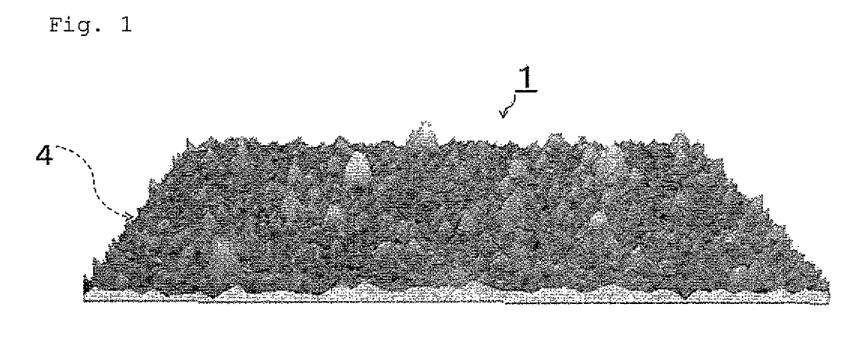
FIG. 1 is a partially cut perspective, view showing a light-shielding coat of a light-shielding material for optical instrument according to an embodiment of the present invention.
Figure 2:
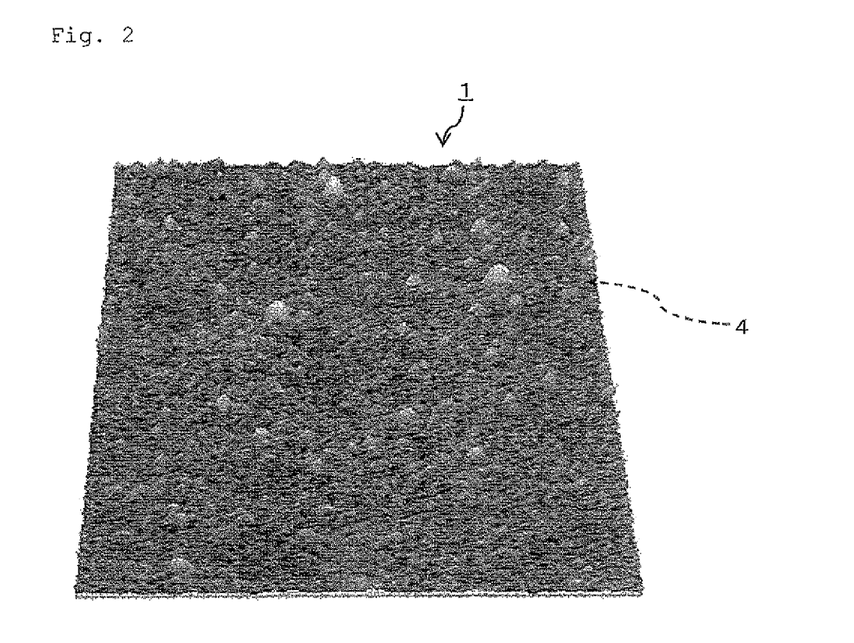
FIG. 2 is a plan view of the light-shielding material in FIG. 1 seen from above (the light-shielding coat side).
Figure 3:
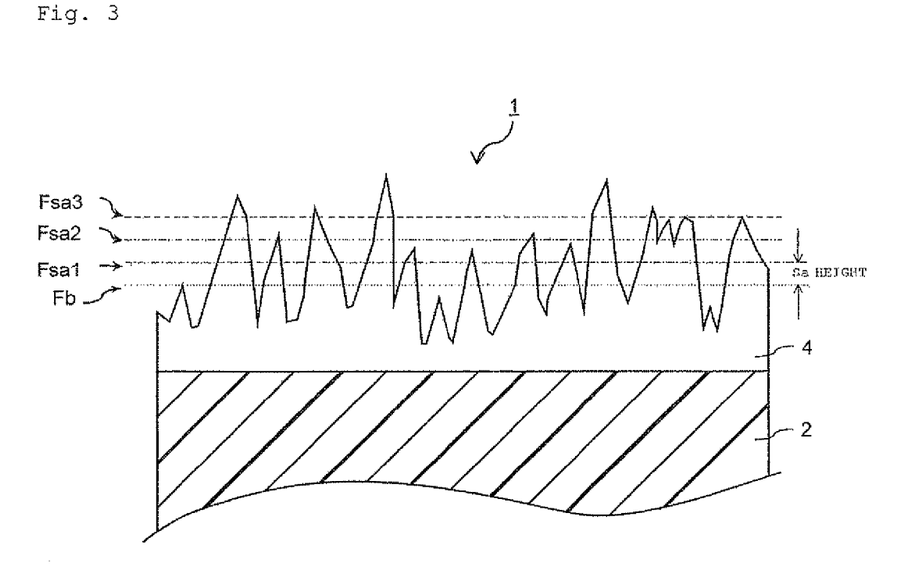
FIG. 3 is an imaginary sectional view of a cut portion when the light-shielding material in FIG. 1 is cut at an arbitrary position along the thickness direction.

As shown in FIG. 1 to FIG. 3, a light-shielding material 1 for optical instrument according to the present embodiment can be suitably used for light-shielding part of optical instrument, such as a camera (including a camera-equipped cellular phone) and a projector, and comprises a substrate 2. In the example shown in FIG. 1 to FIG. 3, a light-shielding coat 4 is formed on one surface of the substrate 2. Note that the present invention includes a mode of forming the light-shielding coat 4 on both surfaces of the substrate 2.

In the light-shielding coat 4 of the present embodiment, surface properties thereof are adjusted properly.

Specifically, first of all, an arithmetic average roughness in a three-dimensional surface of the light-shielding coat 4 is indicated as Sa and ten-point average roughness is indicated as Sz. The Sa and Sz here are based on measurement methods of an arithmetic average roughness (Ra) and a ten-point average roughness (Rz) in a two-dimensional surface roughness in JIS-B0601 (1994) and obtained by expanding those to three dimensions.

For example, they can be measured by using a stylus-type surface roughness measuring apparatus (SURFCOM 1500SD2-3DF: Tokyo Seimitsu Co., Ltd.).

Next, the central plane of unevenness is indicated as a reference plane Fb in measuring three-dimensional surface roughness of the light-shielding coat 4 (refer to FIG. 3). The central plane of unevenness, which is a premise of the reference plane Fb, means an assumed complete plane obtained by levelling off the projections and recesses to be flat when referring, for example, to FIG. 3.

Then, based on the reference plane Fb, defining Pn as the number of projections which protrude to a plane located at a height of n times Sa, and $P_{n+1}$ as the number of projections which protrude to a plane located at a height of (n+1) times Se. Defining Rn as a ratio of Pn and $P_{n+1}$, which is (Pn+1/Pn). Note that n is a positive integer.

To explain the case of n=1 with reference to FIG. 3, for example, "a plane located at a height of 1 time Sa" is indicated by a dotted line Fsa1, and the number of projections P1 protruding from the plane Fsa1 is 11. "a plane located at a height of twice Sa" is indicated by a dotted line Fsa2, and the number of projections P2 protruding the plane Fsa2 is 10. "A plane located at a height of three times Sa" is indicated by a dotted line Fsa3, and the number of projections P3 protruding from the plane Fsa3 is 5. In this case, R1 is calculated as R1=(10/11) 100=approximately 90.9%, and R2 is calculated as R2=(5/10) 100=50%. R3 and on can be calculated by the same method.

Here, in the present embodiment, the surface properties of the light-shielding sheet 4 are adjusted so as to fulfill at least one of the condition A1 and condition A2, and at least one of the condition B1 and condition B2.

Note that combinations of the conditions are as below.
A1 and B1
A2 and B1
A1, A2 and B1
A1 and B2
A2 and B2
A1, A2 and B2
A1, B1 and B2
A2, B1 and B2
A1, A2, B1 and B2

The condition A1 is that a value of Sa is in a predetermined range, specifically, 0.4 or larger, preferably 0.45 or larger and more preferably 0.5 or larger and 2.0 or smaller, preferably 1.9 or smaller and more preferably 1.8 or smaller.

The condition A2 is that a value of Sz is in a predetermined range, specifically, 1 or larger, preferably 3 or larger, and more preferably 5 or larger and 20 or smaller, preferably 18 or smaller and more preferably 16 or smaller.

The condition B1 is that both of R1 and R4 become larger than predetermined values, specifically, R1 is 55% or greater and R4 is 7% or greater.

The condition B2 is that at least all of R1 to R3 become predetermined values or larger, specifically, R1 is 55% or greater, R2 is 15% or greater and R3 is 8% or greater. Because it is "at least" R1, R2 and R3, Rn (for example, R4, etc.) other than the R1 to R3 may be a percent of a positive integer.

The condition B2 in the present embodiment preferably further includes a condition that R4 becomes 7% or greater.

In the condition B1 and condition B2, R1 is preferably 56% or greater and more preferably 57% or greater. R2 is preferably 17% or greater and more preferably 19% or greater. R3 is preferably 9% or greater and more preferably 10% or greater. R4 is preferably 8% or greater and more preferably 9% or greater.

Among the conditions above, A1 and A2 are parameters to determine surface properties wherein an average of unevenness on a surface of the light-shielding coat 4 (the opposite surface of the surface facing to the substrate 2) is not excessively large. Among the conditions above, B1 and B2 are parameters to determine a presence degree of large unevenness on the surface of the light-shielding coat 4. As will be explained later, it is presumed that, as a result of providing small unevenness and large unevenness moderately on the surface of the light-shielding coat 4, a width of a low-gloss region can be broader.

A thickness of the light-shielding coat 4 can be changed arbitrarily in accordance with a use purpose of applying the light-shielding material 1, however, normally 2 μm to 15 μm is preferable, 2 μm to 12 μm is more preferable and 2 μm to 10 μm or so is furthermore preferable. This is for the increasing demands for a thinner layer (for example, thinner than 6 μm or so) particularly to the light-shielding coat 4 in recent years. In the present embodiment, since the surface properties are adjusted properly as explained above, even when a thickness of the light-shielding coat 4 formed on the substrate 2 is 2 μm, low glossiness can be attained easily, arising of a pinhole, etc. on the light-shielding coat 4 can be prevented easily and a required and sufficient light-shielding property can be obtained easily. When it is 15 μm or thinner, cracks on the light-shielding coat 4 is prevented easily.

Since the surface properties are adjusted properly as explained above in the light-shielding coat 4 in the present embodiment, a specular gloss at 60 degrees (G60) on a surface thereof is less than 1, preferably less than 0.7, more preferably less than 0.5 and furthermore preferably less than 0.3. A specular gloss at 85 degrees (G85) on the surface of the light-shielding coat 4 is less than 15, preferably less than 10, more preferably less than 8 and furthermore preferably less than 6. Note that the light-shielding coat 4 of the present embodiment also has a specular gloss at 20 degrees (G20) of less than 0.3 besides G60 and G85.

The specular gloss is a parameter indicating a degree of reflection of an incident light on the surface of the light-shielding coat 4. It is considered that the smaller the value is, the lower the glossiness is, and that the more delustering effect can be obtained as the glossiness becomes lower. The specular gloss at 60 degrees is a parameter indicating that how much of 100 lights irradiated at an angle of 60 degrees is reflected to a light receiving portion (irradiated to the light receiving portion) inclined by 60 degrees to the opposite side when assuming that the vertical direction with respect to the surface of the light-shielding coat 4 is 0 degree. The specular gloss at 85 degrees and that at 20 degrees are based on the same idea.

In the present embodiment, since the surface properties on the light-shielding coat 4 are adjusted properly, the light-shielding coat 4 can obtain a full delustering effect with a broad low-gloss region. As a result, a defect called ghost is not caused in an optical instrument, wherein the light-shielding material 1 of the present embodiment is applied.

In the present embodiment, the reason is not clear why an incident light at 85 degrees can be also prevented surely from reflecting as well as those at 20 degrees and 60 degrees (namely, all of G20, G60 and G85 can be suppressed low) particularly when the surface properties of the light-shielding coat 4 are adjusted so as to satisfy the combining conditions explained above. However, this phenomenon can be considered as explained below. First, when examining a reflection light amount of incident lights with various incident angles, in order to suppress the reflection light amount of lights at angles close to the vertical direction with respect to the layer surface of the light-shielding coat 4, low glossiness can be obtained if the surface is simply rough, while in order to suppress a reflection light amount of incident lights at angles close to the horizontal direction, such as G85, low glossiness cannot be obtained by only being simply rough in some cases. When studying thoroughly, in order to suppress reflection of incident lights from close to the vertical direction, a method of uniformly roughening with small unevenness is also effective; however, in order to suppress reflection of incident lights from close to the horizontal direction, it cannot be attained only by small unevenness and it was found that it is necessary that both the small unevenness and large unevenness are provided properly.

As a result of providing both of the small unevenness and large unevenness properly, incident lights from close to the horizontal direction with respect to the light-shielding coat are blocked by large projections and hardly reach to the other direction, and the blocked light is considered to be absorbed by small unevenness or diffused to be attenuated. Accordingly, it is presumed that due to the proper provision of large and small unevenness on the light-shielding coat surface, low glossiness can be attained also for G85 as well as G20 and G60.

Note that a means to lower all the G20, G60 and G85 by only providing large unevenness can be also considered, however, when forming the light-shielding coat only with large unevenness, the film thickness has to be thick necessarily, which opposes the trend for thinner films in recent years.

The light-shielding coat 4 of the present embodiment provided with the surface properties as above is configured to comprise at least a binder resin, black fine particles and a matting agent.

Next, an explanation will be made on an example of producing a light-shielding material 1 for optical instrument having the configuration explained above.

The light-shielding material 1 for optical instrument according to the present embodiment can be obtained by preparing an application liquid for forming a light-shielding coat by dispersing or dissolving at least a binder resin, black fine particles and a matting agent in a solvent, applying the application liquid to a substrate 2 and drying to form a layer for stacking.

As a binder resin, for example, a poly(meth)acrylic acid-type resin, polyester resin, polyvinyl acetate resin, polyvinyl chloride, polyvinyl butyral resin, cellulose-type resin, polystyrene/polybutadiene resin, polyurethane resin, alkyd resin, acrylic resin, unsaturated polyester resin, epoxy ester resin, epoxy resin, acryl polyol resin, polyester polyol resin, polyisocyanate, epoxy acrylate-type resin, urethane acrylate-type resin, polyether acrylate-type resin, polyether acrylate-type resin, phenol-type resin, melamine-type resin, urea-type resin, diallyl phthalate-type resin and other thermoplastic resins or thermosetting resins may be mentioned; and one or a mixture of two or more of those may be used. When used for a heat resistant use purpose, a thermosetting resin is preferably used.

A content of a binder resin in non-volatile content (solid content) included in the application liquid is preferably 20 wt % or greater, more preferably 30 wt % or greater, and furthermore preferably 40 wt % or greater. When it is 20 wt % or greater, a decline of adhesiveness of the light-shielding coat 4 to the substrate 2 is prevented easily. On the other hand, a content of a binder resin in a non-volatile content in the application liquid is preferably 70 wt % or less, more preferably 65 wt % or less and furthermore preferably 60 wt % or less. When it is 70 wt % or less, a decline of necessary physical properties (light-shielding property, etc.) of the light-shielding coat 4 is prevented easily.

Black fine particles are blended to color the binder resin with black so as to give a light-shielding property to a dried coating (light-shielding coat 4). As black fine particles, for example, carbon black, titanium black, aniline black, iron oxide, etc. may be mentioned. Among them, carbon black is particularly preferably used because it can provide the coating with both a light-shielding property and antistatic property at the same time. The reason why the antistatic property is also required in addition to the light-shielding property is because workability is taken into account at the time of cutting into a predetermined shape and putting the cut product (light-shielding part) as a part in optical instrument after producing the light-shielding material 1.

Note that when not using carbon black as the black fine particles, a conductive agent and antistatic agent may be blended in addition to the black fine particles.

To give a sufficient light-shielding property to the coating, the smaller an average particle diameter of the black fine particles is, the more preferable. In the present embodiment, those having an average particle diameter of, for example, smaller than 1 μm and preferably 500 nm or smaller may be used.

A content of black fine particles in a non-volatile content (solid content) included in the application liquid is preferably 5 wt % to 20 wt % and more preferably 10 wt % to 20 wt %. When it is 5 wt % or greater, a decline of a light-shielding property as a necessary physical property of the light-shielding coat 4 is prevented easily. When it is 20 wt % or less, adhesiveness and abrasion-resistance of the light-shielding coat 4 improve and a decline of strength of the coating and high cost are prevented easily.

A matting agent used for the purpose of the present embodiment is blended generally for forming fine unevenness on a surface of the dried coating, reducing reflection of incident lights on the coating surface thereby to decline glossiness (specular gloss) of the coating and finally enhancing a delustering property of the coating.

Generally, there are organic-type and inorganic-type matting agents, and organic-type fine particles are used preferably in the present embodiment. As organic fine particles, for example, cross-linked acrylic beads (transparent, regardless of being colored or not), etc. may be mentioned. As inorganic fine particles, for example, silica, magnesium aluminometasilicate, titanium oxide, etc. may be mentioned. In the present embodiment, inorganic fine particles may be also used, however, organic fine particles are used preferably in the present embodiment because organic fine particles give a full delustering effect more easily while maintaining strength of the coating.

Note that, in the present embodiment, "use of organic fine particles" includes the case of using both organic fine particles and inorganic fine particles in addition to the case of using only organic fine particles. When using inorganic fine particles together, a content of organic fine particles in the total matting agent may be, for example, 90 wt % or greater and preferably 95 wt % or greater.

In the present embodiment, in a certain particle diameter (explained later as an example), those having a CV value (coefficient of variation of particle size distribution) of a specific value or larger (broad product) may be used. Specifically, for example, matting agents (preferably organic fine particles) having a CV value in a certain particle diameter of 20 or larger, preferably 25 or larger and more preferably 30 or larger may be used. By using such a matting agent, and adjusting an adding amount of the matting agent and a ratio of a light-shielding coat thickness and particle diameter, surface properties of the light-shielding coat 4 can be easily adjusted to be as explained above.

Note that a CV (coefficient of variation) value means a coefficient of variation (also indicated as a relative standard variation) of a particle size distribution used in preparing the application liquid. This value indicates what degree a spread of a particle size distribution (variation in particle diameter) is with respect to an average value (arithmetic average diameter) and is normally obtained by CV value (no unit)=(standard variation/average value). The smaller the CV value is, the narrower the particle size distribution becomes (sharp); while the larger, the broader the particle size distribution becomes (broad).

In the present embodiment, it is preferable to determine a particle diameter of a matting agent to be used, which becomes a standard of the CV value above, in accordance with a film thickness Tt of the light-shielding coat 4 to be formed. It is because of considering the fact that a product mode of the light-shielding material 1 (particularly, a total thickness of a light-shielding material 1 and a thickness of a light-shielding coat) varies in accordance with which part in optical instrument it is used. Specifically, with respect to a film thickness of Tt of a light-shielding coat to be formed, a matting agent having an average particle diameter corresponding to 35% of the Tt or greater, preferably 40% or greater and more preferably 45% or greater and 110% of the Tt or less, preferably 105% or less and more preferably 100% or so or less may be used.

For example, when forming a light-shielding coat 4 having a thickness after drying, which corresponds to a film thickness Tt, of 10 μm or thinner, a matting agent having an average particle diameter of 3.5 μm or so to 11 μm or so may be used. When attaining 5 μm in a thickness after drying of the light-shielding coat 4, a matting agent having an average particle diameter of 1.75 μm or so to 5.5 μm or so may be used.

Note that, in the present embodiment, regardless of the CV value explained above, a mixture of one having a certain average particle diameter and one having another average particle diameter may be used as a matting agent. In that case, an average particle diameter of one of the matting agents should belong to the range above (35% to 110% of Tt), but more preferably, both of the matting agents have average particle diameters in the range above and are combined to be used.

The film thickness Tt means an arithmetic average value obtained by measuring a dried light-shielding coat 4 at 10 different points thereon by using a film thickness meter Millitron 1202-D (made by Mahr GmbH).

An average particle diameter indicates a median diameter (D50) measured by a laser diffraction particle size analyzer (for example, SALD-7000, etc. made by Shimazu Corporation).

A content of a matting agent with respect to 100 wt % of a binder resin may be 50 wt % or greater, preferably 60 wt % or greater and more preferably 70 wt % or greater, while 170 wt % or less, preferably 140 wt % or less and more preferably 110 wt % or less. By blending a matting agent in the range as above into the application liquid, it is possible to contribute to prevent declines of various performances, such as dropping of the matting agent off from the light-shielding coat 4 due to sliding of a finally obtained light-shielding material 1 and a decline of sliding property of the light-shielding material 1.

As a solvent, water, an organic solvent and a mixture of water and organic solvent, etc. may be used.

Note that when used for the purpose, which does not require the light-shielding coat 4 to have a high sliding property, such as the case of using a processed product of the light-shielding material 1 produced in the present embodiment as an ultrathin spacer to be incorporated between respective lenses, it is not necessary to blend any lubricant (wax), which has been blended into the light-shielding coat 4 conventionally. However, a lubricant may be also blended in even in the case of being used for such a purpose.

When adding a granular lubricant, both of an organic type and inorganic type may be used. For example, polyethylene wax, paraffin wax and other hydrocarbon-type lubricants, stearic acid, 12-hydroxy stearic acid and other fatty acid-type lubricants, oleic amide, erucamide and other amide-type lubricants, stearic acid monoglyceride and other ester-type lubricants, alcohol-type lubricants, metallic soaps, talc, molybdenum disulfide and other solid lubricants, silicon resin particles, poly tetra fluoro ethylene wax and other fluorine resin particles, cross-linked polymethylmethacrylate particles, cross-linked polystyrene particles, etc. may be mentioned. When blending a granular lubricant, use of an organic-type lubricant is particularly preferable. Also, when adding a lubricant, which is liquid at normal temperature, fluorine-type compounds and silicon oil, etc. may be used, as well. When blending a lubricant, it is preferable to use those being liquid at normal temperature. It is because as far as the lubricant is liquid, it is hard to affect formation of uneven shapes on the light-shielding coat surface by a matting agent.

Note that as long as it is in a range of not undermining functions of the present invention, in accordance with need, additives, such as flame retardants, antibacterial agents, antifungal agents, antioxidants, plasticizers, leveling agents, fluidity control agents, defoaming agents and dispersants, may be blended into the application liquid for forming a light shielding coat.

As the substrate 2, a polyester film, polyimide film, polystyrene film, polycarbonate film, and other synthetic resin films may be mentioned. Among them, a polyester film is preferably used, and an oriented, particularly, biaxially-oriented polyester film is particularly preferable in terms of excellent mechanical strength and dimension stability. Also, a polyimide film is preferably used for heat resistant purpose.

As the substrate 2, not to mention transparent ones, a thin-film metal plate, wherein a substrate itself has a light-shielding property and strength, may be also used besides foamed polyester films and synthetic resin films containing black pigment, such as carbon black, or other pigment. In that case, suitable one for each use purpose may be selected as the substrate 2. For example, when used as a light-shielding material 1, if a high light-shielding property is required, a synthetic resin film containing same kind of black fine particles as those explained later or a thin-film metal plate may be used, while in other cases, a transparent or foamed synthetic resin film may be used. Since a sufficient light-shielding property as a light-shielding material can be obtained from the light-shielding coat 4 of the present embodiment itself, when containing black fine particles in a synthetic resin film, it is good enough to contain to an extent that the synthetic resin film looks visually black, that is, the optical transmission density becomes 2 or so.

Note that those having a surface processed to be matte by sandblasting and embossing (regardless of a synthetic resin film or a metal plate) may be also used as the substrate 2.

A thickness of the substrate 2 is generally 6 μm to 250 μm or so in terms of strength and stiffness, etc. as a lightweight light-shielding material 1 although it varies depending on the use purpose. In terms of improving adhesiveness to the light-shielding coat 4, the substrate 2 may be subjected to an anchor treatment, corona treatment, plasma treatment or EB treatment as needed.

An application method of the application liquid is not particularly limited and may be performed by a conventional well-known method (for example, dip coating, roll coating, bar coating, die coating, blade coating and air knife coating, etc.).

The application liquid prepared in the present embodiment has a specific gravity of approximately 0.9 to 1.2 or so and a solid content (NV) thereof is adjusted to normally 5% or greater, preferably 10% or greater and normally 40% or less and preferably 30% or less or so. The application liquid is applied to the substrate 2 in an adhesion amount of normally 6 $g/m^2$ or more, preferably 8 $g/m^2$ or more and more preferably 10 $g/m^2$ or more and normally 100 $g/m^2$ or less, preferably 80 $g/m^2$ or less and more preferably 60 $g/m^2$ or less or so.

From the method above, a light-shielding material 1 for optical instrument according to the present embodiment is obtained.

According to the light-shielding material 1 for optical instrument according to the present embodiment, since surface properties of the light-shielding coat 4 is adjusted properly, a full delustering effect having a broad low-gloss region (low at all of G20, G60 and G85) is given to the light-shielding coat 4. Specifically, 60-degree specular gloss (G60) on the surface of the light-shielding coat 4 is adjusted to be lower than 1 and 85-degree specular gloss (G85) to be lower than 15. Also, since the light-shielding coat 4 contains a binder resin and black fine particles, necessary physical properties, such as a light-shielding property, are maintained.

The full delustering effect explained above is useful for use purposes wherein a thinner light-shielding coat 4 (for example, 6 μm or so or thinner) is required particularly. For example, in a camera (image pickup device) as an example of optical instrument, a plurality of lenses are used in a lens part of a photographing optical system and an ultrathin spacer is incorporated between respective lenses. It is particularly useful when applying the light-shielding material 1 according to the present embodiment to the spacers and inner wall, etc. of the photographing optical system. It is a matter of course that it can be applied to part like a shutter and diaphragm as conventionally used.

Note that the production method above is merely one example of producing the light-shielding material 1 for optical instrument of the present embodiment and it is not intended that it can be produced only by this production method. Namely, as far as having a light-shielding sheet with surface properties as explained above, those produced by other production methods would naturally fall under the scope of the present invention.

As production methods other than that explained above, for example, a method of filling a resin mixture containing black fine particles in a cavity of a mold device comprising a positive die and female die and transferring to form shapes, etc. may be considered. In that case, first, a simulation is performed in advance (an example) so that surface properties satisfying at least one of the condition A1 and condition A2 and at least one of the condition B1 and condition B2 are to be transferred to a molding, then a mold, wherein an inner surface of one or both of the dies is finely processed based on information from the simulation result, is prepared. Next, the resin mixture above is filled in the cavity inside formed by closing the mold and set. After that, it is detached from the mold so as to obtain a molding corresponding to the light-shielding material of the present invention. The light-shielding material for optical instrument of the present invention can be produced also by this method.

Note that when the simulation above cannot be performed at preparing a mold, a light-shielding material 1 having the light-shielding coat 4 with adjusted surface properties is produced once by the method explained in the present embodiment, then, a pattern of the surface properties of the light-shielding coat 4 is taken for fine processing on the inner surface of the mold and, after that, a molding can be produced by a transfer shaping method using the mold.

EXAMPLES

Below, the present invention will be explained furthermore with examples. Note that "part" and "%" are based on weight unless otherwise mentioned.

1. Producing Light-shielding Material Samples

Examples 1-1 to 5-2

A black PET film having a thickness of 25 μm (Lumirror X30: Toray Industries, Inc.) was used as a substrate, and application liquids 'a' to 'e' of the formulas below were applied respectively on both surfaces thereof by using a bar coating method. Contents (parts in terms of solid content) of acryl polyol, etc. in respective application liquids are shown in Table 1. The respective application liquids were all prepared to have a solid content of 20%.

After that, light-shielding coats A1 to E2 were formed after drying, so that light-shielding material samples of respective examples were produced. Application amounts (adhesion amounts) of respective application liquids are shown in Table 2 below.

<Formulas of Application Liquids 'a' to 'e' for Forming Light-Shielding Coat>

| | |
|---|---:|
| acryl polyol (solid content 50%) (ACRYDIC A807: DIC Corporation) | 153.8 parts |
| isocyanate (solid content 75%) (BURNOCK DN980: DIC Corporation) | 30.8 parts |
| carbon black (average particle diameter 25 nm) (TOKABLACK #5500: Tokai Carbon Co., Ltd.) | 24 parts |
| matting agent listed in Table 1 | (parts listed in Table 1) |
| methyl ethyl ketone and toluene | 611.4 to 1091.4 parts |

TABLE 1

| | Materials (part, solid content) | | | | | | | | | | | |
|---|---|---|---|---|---|---|---|---|---|---|---|---|
| | Binder Resin | | | | Matting Agent | | | | | | | |
| Application Liquid | Acryl Polyol | Isocyanate | Total | Carbon Black | X1 | X2 | X3 | X4 | X5 | Kind | Averate Particle Diameter (μm) | CV Value |
| a | 76.9 | 23.1 | 100 | 24 | 90 | — | — | — | — | Transparent | 5 | 31.4 |
| b | | | | | — | 90 | — | — | — | Transparent | 5 | 8.45 |
| c | | | | | — | — | 90 | — | — | Transparent | 8 | 34.6 |
| d | | | | | — | — | — | 90 | — | Transparent | 8 | 17.8 |
| e | | | | | — | — | — | — | 90 | Transparent | 8 | 7.84 |

Note that, in Table 1, both of the matting agents X1 and X2 are transparent acrylic beads having an average particle diameter of 5 μm, however, their coefficients of variation (CV values) of particle size distributions are different. The CV values are 31.4 in the matting agent X1, which is a broad product, and 8.45 in the matting agent X2, which is a sharp product.

Also, all of the matting agents X3, X4 and X5 are transparent acrylic beads having an average particle diameters of 8 μm, however, their CV values of particle size distributions are different. The CV values are 34.6 in the matting agent X3, which is a broad product, 17.8 in the matting agent X4, which is a middle product, and 7.84 in the matting agent X5, which is a sharp product.

Below, the matting agents X1 and X2 will be also referred to as transparent 5 μm broad and transparent 5 μm sharp, respectively. Also, the matting agents X3, X4 and X5 will be also referred to as transparent 8 μm broad, transparent 8 μm middle and transparent 8 μm sharp, respectively.

2. Measurement of Three-Dimensional Sa and Sz

Measurements were made on the light-shielding material samples obtained in the respective examples as to three-dimensional arithmetic average roughness (Sa) and ten-point average roughness (Sz) on the light-shielding material surfaces under the following conditions by using a stylus-type surface roughness measuring apparatus (SURFCOM 1500SD2-3DF: Tokyo Seimitsu Co., Ltd.). The results are shown in Table 2.

<Measurement Condition of Sa and Sz>
stylus tip radius: 2 μm
taper angle at stylus tip: 60 degrees
measurement force: 0.75 mN
cutoff value λc: 0.8 mm
measurement speed: 0.6 mm/s
standard length: 0.8 mm
measurement range: 4 mm 0.5 mm 3. Calculation of P1 to P5 and R1 to R4

On each of the light-shielding material samples obtained in the respective examples, a central plane of unevenness on the light-shielding coat surface is obtained first and defined as a reference plane Fb (refer to FIG. 3). Note that the central plane was obtained based on the notion below. It is an assumed complete plane when planarizing so that a volume of projections (mountains) on the upper side of the reference plane Fb becomes equal to a volume of the recesses (valleys) on the lower side of the reference plane Fb and is a reference plane of Sa height and Sz. For example, in the stylus-type surface roughness measurement apparatus used in the present examples, a reference plane is set from calculation by measuring under the measurement conditions above.

Next, from the reference plane Fb, a number of projections P1 protruding to a plane Fsa1 (refer to FIG. 3) located at a height of one time Sa measured in "2. Measurement of Three-Dimensional Sa and Sz" above was obtained by calculating by using Surfcom Map Premium 4.1, which is an analysis software of the measurement apparatus above. In the same way, a number of projections P2 protruding to a plane Fsa2 (refer to FIG. 3) located at a height of two times Sa and a number of projections P3 protruding to a plane Fsa3 (refer to FIG. 3) located at a height three times Sa, as well as P4 and P5, were obtained. The results are shown in Table 2.

Note that Table 2 also shows adhesion amounts of application liquids in Table 1 and film thicknesses of formed light-shielding coats, etc. in addition to heights (unit: μm) of planes from the reference plane Fb in respective samples.

Next, R1 to R4 were calculated based on the obtained P1 to P5. The results are shown in Table 2. Note that R1 is a ratio of P1 and P2, which is (P2/P1), R2 is a ratio of P2 and P3, which is (P3/P2), R3 is a ratio of P3 and P4, which is (P4/P3) and R4 is a ratio of P4 and P5, which is (P5/P4).

TABLE 2

| | Application Liquid | | | | Light-Shielding Coat | | | | | | | | | | |
|---|---|---|---|---|---|---|---|---|---|---|---|---|---|---|---|
| | | | | | Surface Properties | | | | | | | | | | |
| | | Adhesion | | Film Thick- | Conditions A1 and A2 | | | | | | Height of | | | P4 | P5 |
| Example | Formula | Amount (g/m²) | Kind | ness (μm) | Sa (μm) | Sz (μm) | Conditions B1 and B2 | | | | Sa × 1 (μM) | P1 (Quantity) | P2 (Quantity) | P3 (Quantity) | (Quantity) | (Quantity) |
| | | | | | | | R1 | R2 | R3 | R4 | | | | | | |
| 1-1 | a | 21 | A1 | 7 | 0.734 | 10.1 | 61.5 | 27.7 | 28.3 | 25.3 | 0.725 | 3942 | 2425 | 672 | 190 | 48 |
| 1-2 | a | 32 | A2 | 9 | 0.881 | 11.3 | 60.8 | 21.7 | 10.3 | 17.0 | 0.887 | 3921 | 2385 | 517 | 53 | 9 |
| 1-3 | a | 46 | A3 | 10 | 0.973 | 11.2 | 62.9 | 18.2 | 10.0 | 10.5 | 0.909 | 3333 | 2095 | 382 | 38 | 4 |

TABLE 2-continued

| | | Application Liquid | | | Light-Shielding Coat | | | | | | | | | | | |
|---|---|---|---|---|---|---|---|---|---|---|---|---|---|---|---|---|
| | | | | | Surface Properties | | | | | | | | | | | |
| | | | Adhesion | Film Thick- | Conditions A1 and A2 | | | Conditions B1 and B2 | | | | Height of | P1 | P2 | P3 | P4 | P5 |
| Example | Formula | Amount (g/m²) | Kind | ness (μm) | Sa (μm) | Sz (μm) | R1 | R2 | R3 | R4 | Sa × 1 (μM) | (Quantity) | (Quantity) | (Quantity) | (Quantity) | (Quantity) |
| 2-1 | b | 21 | B1 | 6 | 0.476 | 7.7 | 11.9 | 38.2 | 48.4 | 39.9 | 0.48 | 8321 | 989 | 378 | 183 | 73 |
| 2-2 | b | 32 | B2 | 8 | 0.887 | 8.3 | 78.4 | 4.4 | 2.0 | — | 0.89 | 4319 | 3387 | 149 | 3 | 0 |
| 2-3 | b | 46 | B3 | 9 | 0.858 | 9.2 | 26.6 | 13.8 | 5.6 | — | 0.855 | 4812 | 1281 | 177 | 10 | 0 |
| 3-1 | c | 21 | C1 | 8.5 | 0.941 | 13.9 | 57.8 | 41.9 | 42.7 | 39.7 | 0.935 | 3947 | 2281 | 955 | 408 | 162 |
| 3-2 | c | 32 | C2 | 10 | 0.711 | 10.7 | 62.7 | 42.7 | 37.4 | 40.8 | 0.73 | 3847 | 2411 | 1030 | 385 | 157 |
| 4-1 | d | 21 | D1 | 8 | 1.25 | 9.1 | 44.6 | 15.0 | 7.8 | — | 1.23 | 4987 | 2225 | 333 | 26 | 0 |
| 4-2 | d | 32 | D2 | 9 | 0.733 | 9.0 | 52.6 | 29.5 | 18.1 | 6.3 | 0.733 | 5092 | 2679 | 791 | 143 | 9 |
| 5-1 | e | 21 | E1 | 7.5 | 1.41 | 8.3 | 1.0 | 4.4 | 33.3 | — | 1.42 | 6587 | 68 | 3 | 1 | 0 |
| 5-2 | e | 32 | E2 | 8 | 0.659 | 9.0 | 7.12 | 14.7 | 54.8 | 40.4 | 0.64 | 9925 | 707 | 104 | 57 | 23 |

4. Evaluation

Physical properties were evaluated by the methods explained below on the light-shielding material samples obtained in the respective examples. The results are shown in Table 3 and Table 4. Note that the evaluation of (1) Light-Shielding Property below was made on samples formed by applying respective application liquids of the formulas of respective examples above to one surface of respective transparent polyethylene terephthalate films having a thickness of 25 μm (Lummiror T60: Toray Industries, Inc.), so that the adhesion amount becomes 14 g/m² and drying.

Note that Table 3 and Table 4 also includes signs (○ meaning satisfactory and not satisfactory in Tables) showing satisfactory degrees of surface-property conditions of light-shielding coats in respective samples.

(1) Evaluation on Light-Shielding Property

Optical transmission densities of samples in respective examples were measured based on JIS-K7651:1988 by using an optical densitometer (TD-904: Gretag Macbeth). The results are indicated by "o" for those with measurement values exceeding 4.0 and " " for those not exceeding 4.0. Note that a UV filter was used in the optical density measurement.

(2) Evaluation on Conductivity

Surface resistivity (Ω) of light-shielding material samples obtained in the respective examples was measured based on JIS-K6911:1995. Those with a measurement value of 1.0 10⁶Ω or smaller are evaluated as "○", those exceeding 1.0 10⁶Ω but not exceeding 1.0 10¹⁰Ω are "Δ" and those exceeding 1.0 10¹⁰Ω are " ".

(3) Evaluation on Delustering Property

On the light-shielding material samples obtained in the respective examples, specular gloss (unit: %) at 20 degrees, 60 degrees and 85 degrees (G20, G60 and G85) on the light-shielding coat surfaces was measured based on JIS-Z8741: 1997 by using a glossimeter (product name: VG-2000, Nippon Denshoku Industries Co., Ltd.).

As to G20, those with a measurement value of less than 0.3 are evaluated as "", those with 0.3 or greater but less than 0.5 are "◉", those with 0.5 or greater but less than 0.7 are "○" and those with 0.7 or greater are " ". As to G60, those with a measurement value of less than 0.5 are "", those with 0.5 or greater but less than 0.7 are "◉", those with 0.7 or greater but less than 1 are "○" and those with 1 or greater are " ". As to G85, those with a measurement value of less than 8 are "", those with 8 or greater but less than 10 are "◉", those with 10 or greater but less than 15 are "○" and those with 15 or greater are " "

It was observed that the smaller the respective measurement values in G20, G60 and G85 were, the lower the glossiness was, and that the lower the glossiness, the more excellent in delustering property.

TABLE 3

| | Surface Properties of Light-Shielding Coat | | | Performance | | | | |
|---|---|---|---|---|---|---|---|---|
| | | | | | | Delustering Property | | |
| Example | Condition A1 | Condition A2 | Condition B1 | Light-Shielding Property | Conductivity | G20 | G60 | G85 |
| 1-1 | ○ | ○ | ○ | ○ | ○ | ◉◉ | ◉◉ | ◉◉ |
| 1-2 | ○ | ○ | ○ | ○ | ○ | ◉◉ | ◉◉ | ◉◉ |
| 1-3 | ○ | ○ | ○ | ○ | ○ | ◉◉ | ◉◉ | ◉◉ |
| 2-1 | ○ | ○ | X | ○ | ○ | ◉◉ | ○ | X |
| 2-2 | ○ | ○ | X | ○ | ○ | ◉◉ | ○ | X |
| 2-3 | ○ | ○ | X | ○ | ○ | ◉◉ | ○ | X |
| 3-1 | ○ | ○ | ○ | ○ | ○ | ◉◉ | ◉◉ | ◉◉ |
| 3-2 | ○ | ○ | ○ | ○ | ○ | ◉◉ | ◉◉ | ◉◉ |
| 4-1 | ○ | ○ | X | ○ | ○ | ◉◉ | ◉◉ | X |
| 4-2 | ○ | ○ | X | ○ | ○ | ◉◉ | ◉◉ | X |
| 5-1 | ○ | ○ | X | ○ | ○ | ◉◉ | ○ | X |
| 5-2 | ○ | ○ | X | ○ | ○ | ◉◉ | ○ | X |

TABLE 4

| Example | Surface Property of Shielding Coat | | | Performance | | | | |
|---|---|---|---|---|---|---|---|---|
| | Condition A1 | Condition A2 | Condition B2 | Light-Shielding Property | Conductivity | Delustering Property G20 | G60 | G85 |
| 1-1 | ○ | ○ | ○ | ○ | ○ | ◎◎ | ◎◎ | ◎◎ |
| 1-2 | ○ | ○ | ○ | ○ | ○ | ◎◎ | ◎◎ | ◎◎ |
| 1-3 | ○ | ○ | ○ | ○ | ○ | ◎◎ | ◎◎ | ◎◎ |
| 2-1 | ○ | ○ | X | ○ | ○ | ◎◎ | ○ | X |
| 2-2 | ○ | ○ | X | ○ | ○ | ◎◎ | ○ | X |
| 2-3 | ○ | ○ | X | ○ | ○ | ◎◎ | ○ | X |
| 3-1 | ○ | ○ | ○ | ○ | ○ | ◎◎ | ◎◎ | ◎◎ |
| 3-2 | ○ | ○ | ○ | ○ | ○ | ◎◎ | ◎◎ | ◎◎ |
| 4-1 | ○ | ○ | X | ○ | ○ | ◎◎ | ◎◎ | X |
| 4-2 | ○ | ○ | X | ○ | ○ | ◎◎ | ◎◎ | X |
| 5-1 | ○ | ○ | X | ○ | ○ | ◎◎ | ○ | X |
| 5-2 | ○ | ○ | X | ○ | ○ | ◎◎ | ○ | X |

5. Consideration

From Table 3 and Table 4, the followings can be understood. In all examples, a light-shielding property and conductivity of the formed light-shielding coat were preferable. However, those having surface properties of the light-shielding coats not satisfying any of B1 and B2 (example 2-1 to example 2-3 and example 4-1 to example 5-2) were evaluated low on the delustering property at G85.

On the other hand, those having surface properties of the light-shielding coats satisfying at least one of A1 and A2 and at least one of B1 and B2 (example 1-1 to example 1-3, example 3-1 and example 3-2) obtained excellent results on the delustering property also at G85 as well as G20 and G60.

Example 6

Other than blending silicon oil as a liquid lubricant to be 3% in the application liquid "a" used in the example 1-1 to prepare the application liquid "f", a light-shielding coat F was formed on the substrate under the same condition as that in the example 1-1 and light-shielding material samples of example 6 were produced.

After that, when the delustering property was evaluated under the same condition as that in the example 1-1, equivalent efficiency was obtained to that in the case of the example 1-1, however, a sliding property was observed to be superior comparing with that in the example 1-1. Specifically, a coefficient of static friction (μs) was 0.35 or smaller, a coefficient of dynamic friction (μk) was 0.25 or smaller, and it was possible to improve the sliding property without affecting the surface properties of the light-shielding coat.

Note that μs and μk in the present example are based on JIS-K7125:1999 and are values measured under the condition of a load: 200 g and a rate: 100 mm/min.

The invention claimed is:

1. A light-shielding material for optical instrument, having an optical transmission density exceeding 4.0, comprising a light-shielding coat, wherein the light-shielding coat has surface properties adjusted to satisfy at least one of a condition A1 and condition A2 below and at least one of a condition B1 and condition B2 below;

the condition A1: when defining arithmetic average roughness in three-dimensional surface roughness measurement as Sa, a value of Sa is 0.4 μm or larger and 2.0 μm or smaller, the condition A2: when defining ten-point average roughness in three-dimensional surface roughness measurement as Sz, a value of Sz is 1 μm or larger and 20 μm or smaller, the condition B1: when defining a central plane of projections and recesses in a three-dimensional surface roughness measurement as a reference plane, a number of projections protruding to a plane placed at a height n times Sa from the reference plane as Pn, a number of projections protruding to a plane placed at a height (n+1) times Sa as $P_{n+1}$, and a ratio ($P_{n+1}$/Pn) of Pn and Pn+1 as Rn, (note that "n" is an integer of 1-4), R1 becomes 55% or greater and R4 becomes 7% or greater, and the condition B2: when defining Pn, $P_{n+1}$ and Rn in the same way as in the condition B1, at least R1 becomes 55% or greater, R2 becomes 15% or greater and R3 becomes 8% or greater.

2. The light-shielding material for optical instrument according to claim 1, wherein
the light-shielding coat is configured to comprise at least a binder resin, black fine particles and a matting agent and formed on a substrate.

3. The light-shielding material for optical instrument according to claim 1, wherein the condition B2 further includes a condition that R4 becomes 7% or greater.

4. An optical part, wherein the light-shielding material according to claim 1 is used.

5. An image pickup device comprising the optical part according to claim 4.

6. The light-shielding material for optical instrument according to claim 2, wherein the condition B2 further includes a condition that R4 becomes 7% or greater.

7. An optical part, wherein the light-shielding material according to claim 2 is used.

8. An optical part, wherein the light-shielding material according to claim 3 is used.

9. An image pickup device comprising the optical part according to claim 7.

10. An image pickup device comprising the optical part according to claim 8.

11. The light-shielding material for optical instrument according to claim 2, wherein the matting agent has a variation coefficient of 20 or larger.

12. The light-shielding material for optical instrument according to claim 2, wherein the light-shielding coat is configured to further include a lubricant being liquid at normal temperature.

13. The light-shielding material for optical instrument according to claim 11, wherein the condition B2 further includes a condition that R4 becomes 7% or greater.

14. The light-shielding material for optical instrument according to claim 12, wherein the condition B2 further includes a condition that R4 becomes 7% or greater.

15. An optical part, wherein the light-shielding material according to claim 11 is used.

16. An optical part, wherein the light-shielding material according to claim 12 is used.

17. An image pickup device comprising the optical part according to claim 15.

18. An image pickup device comprising the optical part according to claim 16.

* * * * *